Sept. 26, 1967  K. SIMONYAN ET AL  3,344,351
TESTING APPARATUS FOR A SEQUENCE OF
TRANSISTORS AND THE LIKE HAVING A
CONDITION RESPONSIVE MARKER Filed June 3, 1963  3 Sheets-Sheet 1

INVENTORS
KARABET SIMONYAN
HANJOO KIM
BY
James and Franklin
ATTORNEYS

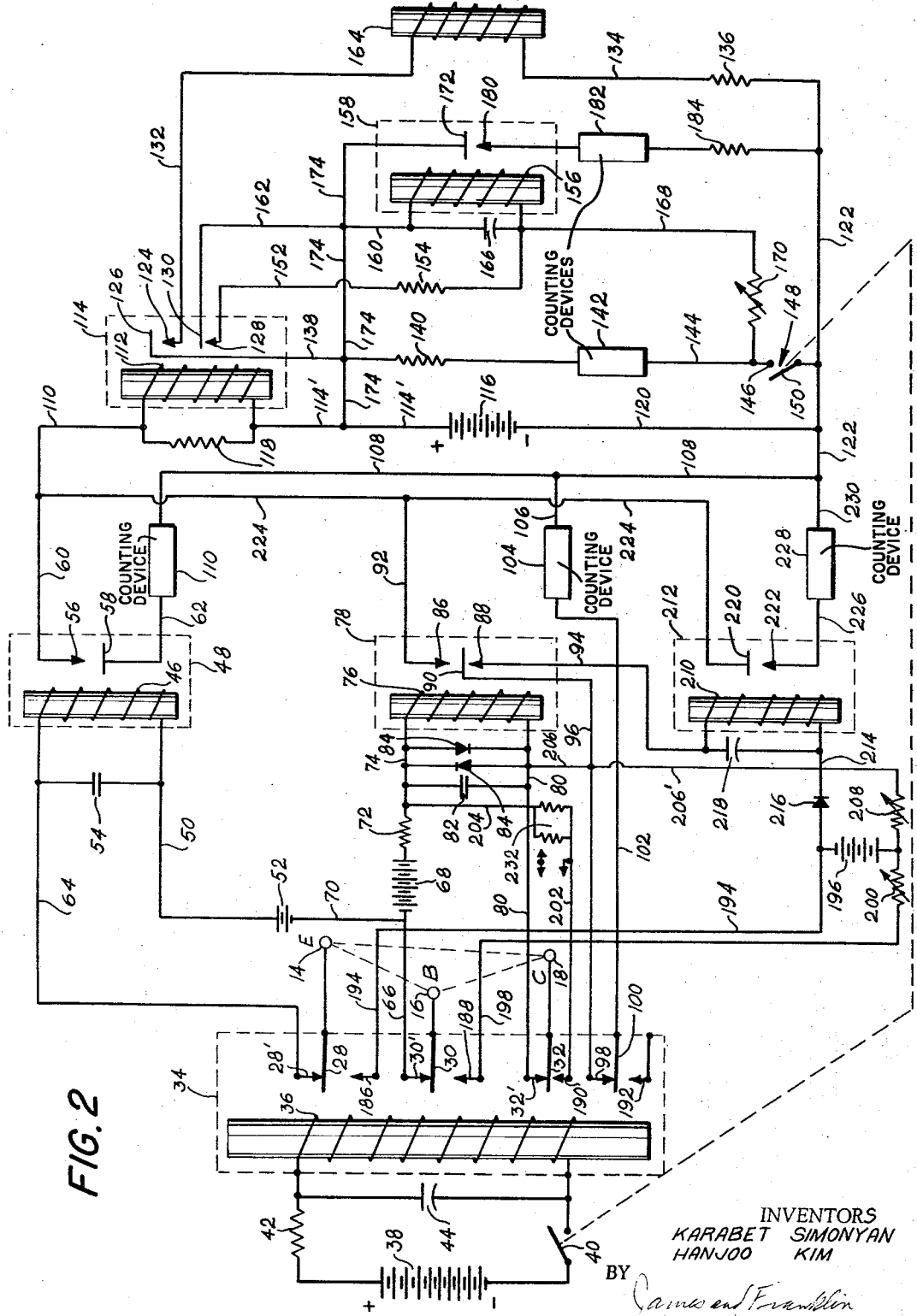

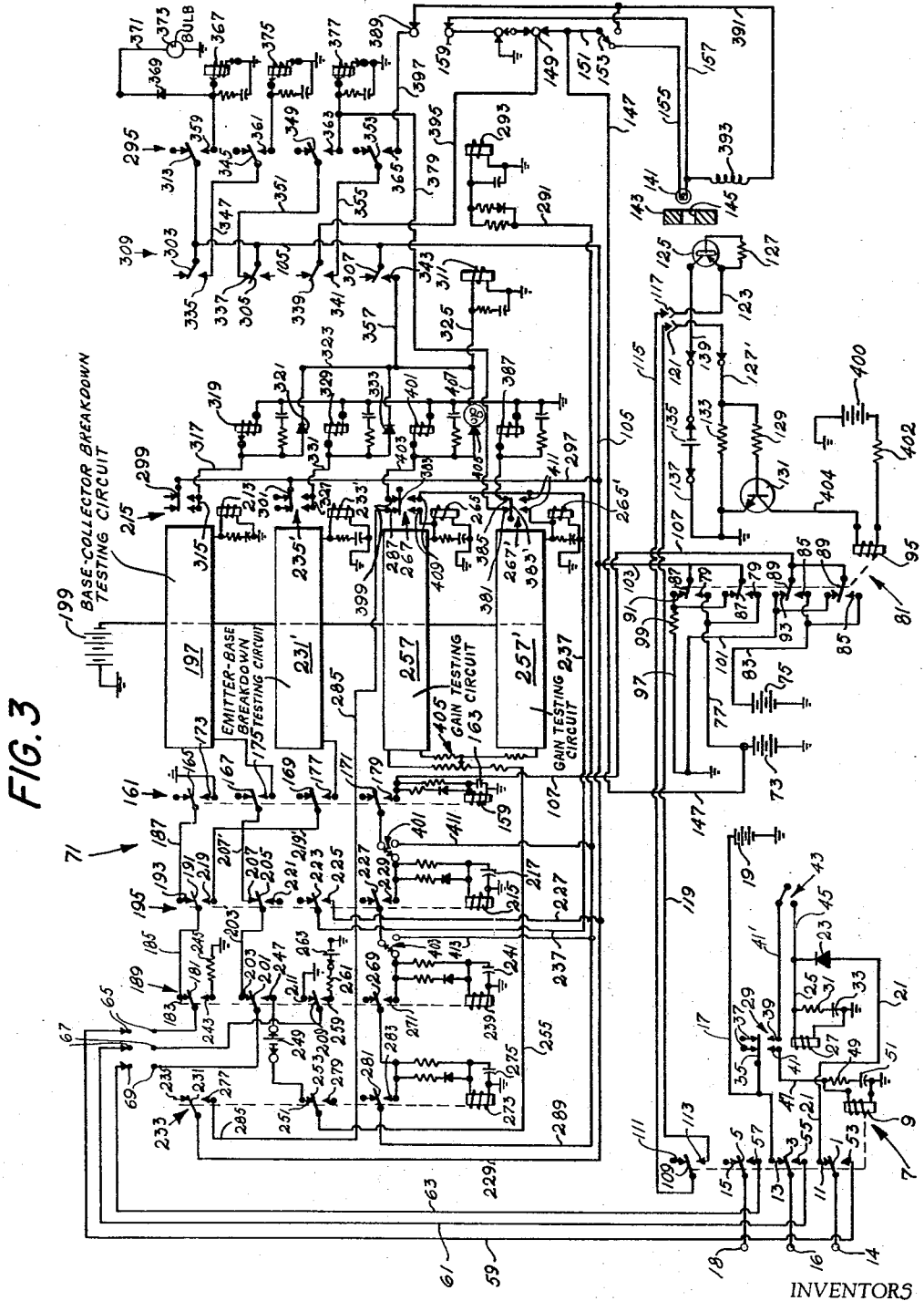

United States Patent Office 3,344,351
Patented Sept. 26, 1967

3,344,351
TESTING APPARATUS FOR A SEQUENCE OF TRANSISTORS AND THE LIKE HAVING A CONDITION RESPONSIVE MARKER
Karabet Simonyan, Rego Park, and Hanjoo Kim, Forest Hills, N.Y., assignors to General Instrument Corporation, Newark, N.J., a corporation of New Jersey
Filed June 3, 1963, Ser. No. 284,883
13 Claims. (Cl. 324—158)

The present invention relates to a device for testing selected operational conditions of transistors and for indicating the results of said tests in a convenient and effective manner.

The manufacture of transistors is a very delicate matter. The devices themselves are tiny, their electrical characteristics are extremely sensitive to minute variations in the compositions of the materials involved as well as the dimensions of their various sections, and yet the devices must, as a competitive matter, be manufactured in large quantities. In any given run many hundreds of individual units are made at one time. It is an accepted fact that in any given run an appreciable number of individual units will, for one reason or another, fail to come up to design specifications. It is essential that these faulty units be identified and rejected. Testing or quality control by sampling is not adequate, since customers demand that none of the units which they purchase should be defective.

It is possible to handle each transistor unit individually and subject it to appropriate tests. In accordance with this old and essentially unsatisfactory procedure, a worker will pick up a given unit with a pair of tweezers, place it on a testing table, apply electrical probes to appropriate portions of the surface of the unit, connect those probes to appropriate circuitry, observe the results of the tests, repeat that procedure to carry out a plurality of different tests, and then place the individual unit into an "accepted" bin or a "reject" bin, in accordance with the results of the tests as observed by the worker. The sequence is then repeated for the next unit, and so on. The operations involved are quite delicate, particularly in view of the small size of the units. This type of procedure is not only obviously time consuming but is also inherently inaccurate because the operator is always under pressure to test as many units as possible in a given period of time and because of possible fatigue or inattention on the part of the operator, leading to misplacing of the probes on the extremely minute contact areas of the unit under test, misreading or forgetting the readings of the indicating instruments or accidentially putting the tested unit into the wrong bin. It further subjects the individual transistor units to unnecessary handling which is, in and of itself, a source of damage.

It will be seen that there therefore exists a great need for a device capable of use on a production line which will, rapidly and accurately, subject transistors to tests of specified operating conditions and which will effectively identify, or differentiate between, those devices which meet the specifications and those which do not. It is the prime object of the present invention to produce such a device.

More specifically, the device of the present invention permits the sequential testing of a large number of individal transistor units without requiring individual manipulation of each unit. To this end, several hundred units to be tested may be placed on a single mounting plate and brought to the testing device. That device comprises a support or head which carries a plurality of probe elements so spaced as to engage the exposed contact areas on the surface of a given test specimen corresponding to the collector, emitter and base terminals of the transistor. All that the operator need do is position the head over a given transistor unit to be tested and then cause the head to move down, bringing the probe elements into operative engagement with the corresponding terminals of the test specimen. This can be done either manually, automatically or semi-automatically. When the probe elements are in position the testing portion of the device is energized, tests of predetermined electrical operating characteristics are automatically carried out, and the results of those tests are analyzed and an appropriate signal is produced indicating whether the test specimen has passed or failed the tests to which it has been subjected. In addition to such indication, tabulating devices such as counters are preferably employed, which give a ready-reference statistical analysis of the record of passes and failures. This is of inestimatable value in indicating whether particular production techniques are producing too many rejects or not.

The particular type of indication as to whether a given test specimen has passed the test or not may vary widely. For example, a bell could ring or a light could flash, indicating to the operator that that particular unit is defective and should be removed from the mounting plate. However, to remove each failing unit from the plate immediately following the tests would delay the testing of subsequent units and thus greatly reduce the efficiency of the testing device. Accordingly it is preferred that the operator test all of the units on the mounting plate one after the other, without delay, and that one class of units (either those which pass or those which fail) be appropriately marked. After the mounting plate has been removed from the testing device, the rejects can then be identified and separated from those units which meet the specifications. Thus in the device of the present invention a marker is provided which, as here specifically disclosed, marks the rejects, but without interrupting the sequence of tests.

Because of the extremely small size of the units being tested, it is very difficult to apply a mark to the unit which is actually under test. The probe elements which engage with the terminals of the unit leave practically no space for a marking device to reach the unit under test. Rather than make space for a marking device by minimizing the size of the probe elements, an expedient which would detract from the reliability of the testing device and would make it more difficult to ensure that proper electrical connection is made between the probe elements and the transistor terminals, it is preferred that the marking device be active on a transistor unit other than the one which is under test at a particular moment, preferably the unit which has been tested on the preceding cycle of operation of the device. To that end the device is provided with a "memory" which causes the marking device to make a mark on the unit with which it is aligned only when a preceding test has indicated a failure (or a passing, depending upon the significance of the mark). Hence the operator merely moves along a row of units, testing one after the other without delay, and the testing device senses the results of the tests performed and marks each failing or passing unit when a suceeding (as here specifically disclosed, the next succeeding) unit is being tested. The only delay involved is that the operator must, at the end of a row, bring the supporting head down on a non-existent unit, thereby to permit the last unit in the row to be marked in accordance with the results of the tests performed upon it.

Means may be provided for preventing energization of the testing circuits unless proper electrical connection is made between the probe elements and the terminals of the transistor under test, and to remove power from the testing circuit when the tests have been completed. Means are provided for indicating to the operator when the tests have been completed and recorded, thus notifying the operator that the support or head which carries the probe elements should be moved to the next transistor for the next cycle of tests.

The testing circuits are appropriately operatively connected, by means of inherently efficient and reliable circuit arrangements, to the test indicator and, if desired, to appropriate tabulating or counting devices.

The device may be used for the testing of many different electrical operating characteristics, but is particularly well adapted for the testing of base-collector and base-emitter breakdown and DC gain. Because of the different biasing requirements, the gain test and the breakdown tests are preferably performed at different times, automatically timed actuation being provided for the circuits performing these different tests. The base-emitter and base-collector breakdown tests can be carried out either simultaneously or sequentially. Individual counters can be provided to indicate the number of units which pass or fail each individual test.

To the accomplishment of the above, and to such other objects as may hereinafter appear, the present invention relates to a transistor testing device, as defined in the appended claims, and as described in this specification, taken together with the accompanying drawings, in which:

FIG. 2 is a circuit diagram of a simplified version of the testing, indicating and counting circuits of the present invention;

FIG. 3 is a circuit diagram of a more sophisticated version thereof; and

Figure 1:
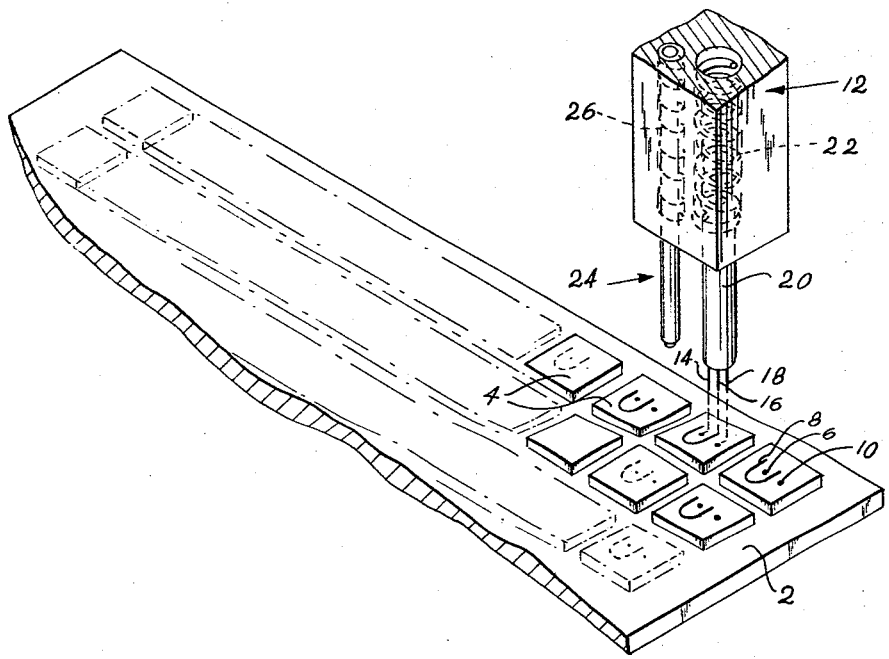
FIG. 1 is an idealized schematic three-quarter perspective view of the supporting head, probe elements and marking device of the present invention, illustrating schematically the manner in which a sequential series of tests are performed on a plurality of transistor test specimens.

FIG. 1 discloses a mounting plate 2 on which a plurality of individual transistor elements 4 are mounted, those elements being arranged in rows. (In the drawing the size of the elements 4 is greatly exaggerated for purposes of illustration.) Each element is provided, on its upper surface, with emitter, base and collector terminal areas 6, 8 and 10 respectively. Several hundred individual transistor units 4 may be mounted on a single mounting plate 2. This method of arrangement of individual transistor units 4 is particularly convenient to achieve in production runs, since ordinarily a large number of embryonic transistor units are fabricated simultaneously in a comparatively large slice or wafer, the individual units then being formed by dicing that wafer. The dicing of a wafer inherently forms a plurality of individual units 4 arranged in rows as indicated in FIG. 1. The individual elements formed as a result of dicing the original wafer may therefore be transferred as an assembly, and without regard to arranging or individual manipulation of units, to the testing station.

At the testing station a table (not shown) is provided on which the mounting plate 2 may rest. Mounted above that table in any appropriate manner is a support or head generally designated 12 which may be moved up and down toward and away from the mounting plate 2 and which may also be moved laterally so as to bring it into alignment with one and then another of the individual transistor units 4. The actual mounting and moving means for the head 12 may take a wide variety of forms, and constitutes no part of the present invention. The head 12 may be moved up and down manually by the operator, or power means under the control of the operator may be provided for that purpose. Similarly, the head 12 may be aligned with the appropriate transistor unit 4 to be tested either manually, by the operator, or automatically, in accordance with a predetermined degree of spacing between the individual transistor units, by photoelectric sensing, or in any other manner.

The head 12 carries a trio of electrical probe elements 14, 16, and 18 which, when the head 12 is moved downwardly, engage and make electrical connection with the terminal areas 6, 8 and 10 of the transistor unit 4 under test. It is preferred that the probe elements 14, 16 and 18 be mounted in a housing 20 which is telescopable within the support head 12 and which is resiliently urged outwardly therefrom to a limited degree by spring 22.

The support head 12 also carries a marking device generally designated 24 which is adapted, when it is appropriately actuated, to place a mark of paint or ink on the upper surface of the transistor unit 4 with which it is aligned. The construction of such marking devices is well known and, per se, forms no part of the present invention. It is a matter of indifference whether the marking device 24 engages the upper surface of a transistor unit 4 each time that the support head 12 is moved downwardly, and marks that surface only when it is appropriately actuated, or whether it places a mark on the surface of a transistor unit 4 each time that it makes engagement therewith, but is so mounted on the head 12 that it is normally spaced from the upper surface of the transistor unit 4 in registration therewith, and is moved downwardly into engagement therewith only when appropriately actuated. The essential feature is that the marking device 24 make a mark of a given character only when that is desired. The actuating mechanism for the marking device 24 is schematically designated 26, and may represent a solenoid which, when energized, causes the marking device 24 to make a desired type of mark.

FIG. 2 represents the circuitry of a simplified version of the testing device of the present invention. The emitter, base and collector probe elements 14, 16 and 18 are connected respectively to armatures 28, 30 and 32 of relay 34, the relay being actuated by winding 36 connected to 100 volt battery 38 via switch 40 and 5K ohm resistor 42, a time delay 400 mfd. capacitor 44 being connected across the winding 36. Normally, when the winding 36 is insufficiently energized, armatures 28, 30 and 32 are connected to the upper terminals 28', 30', and 32' respectively. Terminal 28' is connected, by lead 64, to the upper end of the winding 46 of relay 48, the lower end of that winding being connected by lead 50 to the positive side of a three-volt battery 52. A 20 mfd. capacitor 54 is connected across the winding 46. The relay 48 comprises normally open contacts 56 and 58 connected to leads 60 and 62 respectively.

The terminal 30' is connected by lead 66 to the negative side of 60-volt battery 68, lead 70 connecting the negative side of battery 68 with the negative side of battery 52. The positive side of battery 68 is connected via 2.5K resistor 72 and lead 74 to the upper end of winding 76 of relay 78. The lower end of the winding 76 is connected by lead 80 to the terminal 32' of relay 34. A 20 mfd. capacitor 82 is connected across the winding 76, as are a pair of parallel connected and oppositely oriented rectifiers 84 designed to break down and conduct when a .5 volt potential difference is applied thereacross. The relay 78 is provided with two fixed contacts 86 and 88 and with a movable contact 90 therebetween, the fixed contacts 86 and 88 being connected respectively to leads 92 and 94, while the movable contact 90 is connected to lead 96. Lead 96 is connected at its other end to fixed terminal 98 of relay 34, that contact normally being engaged with armature 100, the armature 100 being connected by lead 102 to one side of base-collector breakdown counting device 104, the other side thereof being connected by lead 106 to lead 108. Lead 62 connects to one side of base-emitter breakdown counting device 110, the other side thereof being connected to lead 108. Lead 60 is connected to lead 110, which in turn is connected to the upper end of winding 112 of relay 114, the lower end of winding 112 being connected by lead 114' to the positive side of 35 volt battery 116. A 100-ohm resistor 118 is connected across the winding 112. The negative side of battery 116 is connected by lead 120 to lead 122.

The relay 114 comprises a fixed contact 124 with which movable contact 126 cooperates and a fixed contact 128 with which movable contact 130 cooperates, the movable contacts normally being out of engagement with their respective fixed contacts. Fixed contact 124 is connected to lead 132 which extends to the upper end of solenoid winding 164, the lower end of the winding 164 being connected by lead 134 and 35 ohm resistor 136 to lead 122. The movable contact 126 is connected by lead 138 and 100 ohm resistor 140 to the upper end of units-tested counting device 142, the lower end of that counting device being connected by lead 144 to terminal 146 of switch 148. The other terminal 150 of the switch 148 is connected to lead 122.

Contact 128 is connected by lead 152 and 100 ohm resistor 154 to the lower end of winding 156 of relay 158, the upper end of the winding 156 being connected by leads 160 and 162 to the movable contact 130 of relay 114. Time delay capacitor 166 is connected across the winding 156, and the lower end of the winding 156 is connected, by lead 168 and adjustable resistor 170, to the terminal 146 of switch 148. Leads 114', 138 and 162 are all connected to one another, and to contact 172 of relay 158, by lead 174. The other and normally open contact 180 of relay 158 is connected by units-passed counting device 182 and 100 ohm resistor 184 to lead 122.

When the winding 36 of the relay 34 is sufficiently energized, the armatures 28, 30, 32 and 100 of that relay will shift from their upper contacts 28', 30', 32' and 98 respectively to their lower contacts 186, 188, 190 and 192 respectively. Contact 192 is blind. Contact 186 is connected by lead 194 to the negative end of 10 volt battery 196. Contact 188 is connected by lead 198 and adjustable 10K ohm resistor 200 to the positive end of battery 196. Contact 190 is connected by leads 202 and 204 to lead 74. Leads 206 and 206' connect leads 80 and 96 to one another and to the positive side of battery 196 via adjustable 50 ohm resistor 208. Lead 94, connected to terminal 88 of relay 78, extends to the upper end of winding 210 of relay 212, the lower end of the winding 212 being connected by lead 214 and rectifier 216, oriented as shown, to the negative side of battery 196. The rectifier 216 is designed to break down and contact in the indicated direction when a potential difference of about .5 volt is applied thereto. A 60 mf. condenser 218 is connected across the winding 210. The relay 212 comprises normally open contacts 220 and 222, the contact 220 being connected by lead 224 to leads 60 and 92 and the contact 222 being connected by lead 226, gain-failure counting device 228 and lead 230, to leads 108 and 122.

The device of FIG. 2 is designed to test the base-collector breakdown, the base-emitter breakdown and the DC gain of the transmitter unit 4 under test. If base-collector breakdown occurs at less than 60 volts, if base-emitter breakdown occurs at less than 3 volts, or if the DC gain is less than 20, the unit 4 should fail.

The method of operation of the system of FIG. 2 is as follows: When the head 12 moves downwardly the probe elements 14, 16 and 18 engage the terminal areas 6, 8 and 10 of the individual transistor unit 4 under test, and as the head 12 moves down further the probe element mounting device 20 telescopes into the head 12. When this telescoping action commences the switch 148 is closed. A circuit is then completed between the terminals of the battery 116 through lead 174, resistor 140, units-tested counting device 142, lead 144, switch 148, and leads 122 and 120, thus actuating the units-tested counting device 142. The switch 40 is also closed, either at the same time as the switch 148 or later, thus completing a circuit from the battery 38 through the winding 36 of the relay 34, but the resistor 42 and capacitor 44 provide a time delay, so that the relay 34 remains unactuated for a time.

The closing of the switch 148 also completes a circuit through the winding 156 of relay 158, which circuit can be traced from the positive side of battery 116 through leads 114', 174 and 160 through the winding 156, and through lead 168, resistor 170, switch 148 and leads 122 and 120 to the negative side of battery 116. However, because of the time delay provided by the capacitor 166 and the adjustable resistor 170, the relay 158 remains unenergized for a period of time.

During the time that the winding 36 of relay 34 is not operatively energized the emitter probe 14 is biased 3 volts positive with respect to the base probe 16, and the collector probe 18 is biased 60 volts positive with respect to the base probe 16. If base-emitter breakdown occurs an appreciable current will flow through the winding 46 of relay 48, actuating that relay and closing the contacts 56 and 58 thereof. If base-collector breakdown should occur an appreciable current will flow through the winding 76 of relay 78, actuating that relay and closing the contacts 86 and 90 thereof.

When the relay 48 is actuated by base-emitter breakdown, the closing of the contacts 56 and 58 completes a circuit through base-emitter breakdown counting device 110 and through the winding 112 of relay 114. Thus the counting device 110 will be actuated each time that a unit fails the base-emitter breakdown test. Each time that the relay 78 is actuated by base-collector breakdown, the closing of the contacts 86 and 90 completes a circuit as follows: From the positive side of battery 116 through lead 114', winding 112, lead 110, leads 224 and 92, contacts 86 and 90, lead 96, contact 98 and armature 100, lead 102, base-collector breakdown counting device 104, leads 106, 108, 122 and 120 to the negative side of battery 116. This will cause actuation of the counting device 104 each time that a unit fails the base-collector breakdown test. The winding 112 of relay 114 will be energized when either the base-emitter or base-collector test is failed.

The time delay applied to the relay 34 is sufficient for the two breakdown tests to be made. Thereafter energization of the winding 36 shifts the armatures of the relay 34, and conditions the device for the testing of the DC gain of the transistor under test. The armatures 28, 30 and 32, connected respectively to the emitter, base and collector probe elements 14, 16 and 18 respectively, then engage the contacts 186, 188 and 190 respectively. The emitter probe 14 is then connected to the negative side of the 10 volt battery 196, the collecor probe 18 is connected to the positive side of the battery 196 via the winding 76 and resistor 208, and base probe 16 is connected to the positive side of the battery 196 via resistor 200. Under these circumstances the collector current will pass through the winding 76 of relay 78 in such a direction as to tend to cause engagement between the contacts 88 and 90. When such engagement takes place the winding 210 of relay 212 is energized, the upper end thereof being connected by lead 94, contacts 88 and 90, leads 96 and 206' and resistor 208 to the positive side of the battery 196, the negative side of that battery being connected to the winding 210 via recifier 216 and lead 214. The battery 196 thus tends to bias relay 212 to closing condition. However, the collector current also flows through resistor 208, and does so in opposition to the current through that resistor which tends to energize the winding 210. Through proper setting of the resistors 200 and 208, the balancing effect of the emitter current on the battery-energization of the winding 210 can be adjusted so that the winding 210 will be energized sufficiently to close the contacts 220 and 222 only when the emitter current is insufficient, that is to say, only when the DC gain of the transistor being tested is below desired value.

The closing of the contacts 220 and 222 of relay 212 closes a circuit through gain test counting device 228 and winding 112 of relay 114. Thus the counting device 228 will be energized each time that a transistor fails the DC gain test, and the winding 112 of the relay 114 will be similarly actuated.

Thus it will be seen that the counting devices 110, 104 and 228 are individually actuated when the particular test to which they relate is failed, and that the winding 112 of relay 114 is energized each time that any test is failed.

When the relay 114 is energized contacts 128 and 130 close. This connects resistor 154 across the winding 156 of relay 158 and across the time delay capacitor 166 thereof. That time delay capacitor 166 has been charging, via resistor 170, during the time that the testing operations have been carried out, the time delay provided thereby being greater than that being provided by the capacitor 44 of relay 34. Thus if any of the tests are failed the capacitor 166 is permitted to discharge through the resistor 154 before the relay 158 is actuated. However, if all of the tests are passed, the relay 114 will not be actuated and hence, after a predetermined period of time, the winding 156 of relay 158 will be energized sufficiently to cause the contacts 172 and 180 to close. This will complete a circuit through the units-passed counting device 182. Hence that counting device will be actuated only when a unit passes all of its tests.

The energization of relay 114 in response to failure of any one of the tests also closes contacts 124 and 126. This completes a circuit through the solenoid 164. Solenoid 164 is used, either alone or in conjunction with other control instrumentalities, to actuate a suitable indicating device, thereby to apprise the operator that a given unit has failed. That indicating device may take a wide variety of forms—it may be an audible or visual alarm or, as broadly described above, it may comprise a device for marking the individual tested unit.

The capacitor 82 and the rectifiers 84 are provided for safety purposes, and to take into account surges of current or voltage. The network 232 is provided so that a suitable recording device can be connected to the system.

FIG. 3 discloses a more sophisticated circuit arrangement for performing the same tests as the system of FIG. 2. With the system of FIG. 3 the base-collector and base-emitter breakdown tests are performed sequentially, instead of at the same time as in the system of FIG. 2, and an additional gain test is carried out which is more rigorous than the standard gain test, this more rigorous test giving rise to a statistical indication without causing rejection of the unit. In addition, in the system of FIG. 3 means are disclosed for initiating the testing step only when proper connection is made to the unit being tested and the support head 12 is in proper position. This latter means could be used with the embodiment of FIG. 2 if desired.

The emitter, base and collector probe elements are, as in the embodiment of FIG. 2, designated 14, 16 and 18 respectively. They are connected respectively to the armatures 1, 3 and 5 of relay 7, the relay being controlled by winding 9. The armatures 1, 3 and 5 are normally connected respectively to contacts 11, 13 and 15. Contact 15 is blind. Contact 13 is connected by lead 17 to the positive side of 24-volt battery 19, the negative side of that battery being connected to ground. Contact 11 is connected by lead 21 and rectifier 23 to lead 25. The winding 27 of relay 29 is connected between lead 25 and ground, with resistor 31 and capacitor 33 connected thereacross. The relay 29 is provided with an armature 35 which normally engages a pair of blind contacts 37 but which, when the winding 27 is energized, engages and connects contacts 39 and 41. Contact 39 is connected to lead 41' which extends to switch 43, the other end of the switch 43 being connected by lead 45 to the rectifier 23 and the winding 27. The contact 41 is connected by lead 47 to the upper end of winding 9 of relay 7, the lower end of the winding 9 being grounded and resistor 49 and capacitor 51 being connected across the winding 9.

The armatures 1, 3 and 5 are adapted to engage with contacts 53, 55 and 57 respectively when the winding 9 is actuated, those contacts respectively being connected by leads 59, 61 and 63 to terminals 65, 67 and 69 at the testing portion of the system, generally designated 71.

Power for the testing portion of the system is provided by a 26-volt battery 73 and an 80-volt battery 75, the negative ends of both of which are connected to ground. The positive end of battery 73 is connected by lead 77 to the contacts 79 of relay 81, while the positive side of battery 75 is connected by lead 83 to the terminals 85 of relay 81. Armatures 87 and 89 of the relay 81 are normally in engagement respectively with contacts 91 and 93, but are adapted, when the winding 95 of the relay 81 is energized, to be moved into engagement with the contacts 79 and 85 respectively. The contacts 91 are connected by lead 97 and resistor 99 to ground and the contacts 93 are connected by lead 101 to ground. The armatures 87 are connected by lead 103 to lead 105, and the armatures 89 are connected to lead 107.

The relay 7 has an additional armature 109 normally in engagement with blind contact 111 but adapted to be engaged with contact 113 when the winding 9 is energized. Armature 109 is connected by lead 115 to terminal 117 and the contact 113 is connected to lead 119 to terminal 121. Terminal 117 is connected by lead 123 to the emitter of a phototransistor 125, a resistor 127 being connected between the emitter and base thereof. The terminal 121 is connected by lead 127' and resistor 129 to the base of a transistor 131, a resistor 133 being connected between the base and emitter of that transistor, the emitter being connected to ground. A 1.5 volt battery 135 has its positive side connected to ground by lead 137 and has its negative side connected to the collector of phototransistor 125 via lead 139. Power for the transistor circuits is provided by 24 volt battery 400, the positive end of which is grounded and the negative end of which is connected to the collector of transistor 137 via resistor 402, the winding 95 of the relay 81, and lead 404.

A bulb 141 is positioned in light-transmissive relationship to the phototransistor 125, with a masking element 143 having an aperture 145 therein interposed therebetween. The masking element 143 is operatively connected to the support head 12 so as to move therewith.

Lead 147 is connected at one end of the positive side of battery 73 and at its other end to terminal 149. Lead 151, switch 153 and lead 155 connect terminal 149 to one end of the bulb 141, the other end thereof being connected by lead 157 to grounded terminal 159. Thus the bulb 141 will be illuminated whenever the switch 153 is in the position shown in FIG. 3.

The circuit as thus far described is designed to control the application of power to the testing system proper 71 and, more specifically, to apply power thereto only when proper electrical connection is made with the terminals 6, 8 and 10 of the transistor 4 under test, and only when the support head 12 is in its proper position, applying proper pressure on the probe elements 14, 16 and 18. To that end the switch 153 is moved to its illustrated position, illuminating the bulb 141, at any appropriate time, as when the head 12 starts to move down, or when the probe assembly 20 starts to telescope into the head 12. The opening 145 in the masking element 143 is positioned to permit light to pass from the bulb 141 to the phototransistor 125 only when the support head 12 is in its fully lowered position. As the support head 12 starts to move down the switch 43 is closed. A circuit is thus established from base probe element 16 to the positive side of battery 19 and from emitter probe element 14 through the winding 27 of relay 29 to ground. If sufficient base-emitter current passes through the transistor being tested, which will occur only if proper electrical connection is made thereto by the probe elements 14 and 16, the winding 27 will be energized and the armature 35 will connect terminals 39 and 41. This completes a circuit for the emitter current through the winding 9, actuating relay 7 and causing the armatures 1, 3 and 5 thereof to engage with contacts 53, 55 and 57, thus connecting the probe elements 14, 16 and 18 to the terminals 65, 67 and 69 respectively of the testing section 71. In addition, energization of relay 7 connects armature 109 and terminal 113, thus closing the circuit to the phototransistor 125 and the control transistor 131. However, for so long as the phototransistor 125 is not illuminated, the collector current through the transistor 131 will be insufficient to cause energization of the winding 95 of the relay 81. That situation of insufficient illumination will continue until the support head 12 has moved all the way down. Once that has happened light from the bulb 141 will pass through the aperture 145 in the masking element 143, the phototransistor 125 will be illuminated, the collector current of transistor 131 will rise, the winding 95 will be energized, and the armatures 87 and 89 of the relay 81 will connect the positive sides of batteries 73 and 75 to the leads 103 and 107 respectively, those leads then supplying power to the testing section 71.

That portion of the system of FIG. 3 thus far described could, it is obvious, be used with the system of FIG. 2 for the same purposes, to wit, to ensure that the testing system is not energized unless and until proper electrical connection is made to the unit under test and the support head 12 is in its proper position.

The lead 107, when energized by the closing of the relay 81, applies power to the winding 159 of relay 161, across which winding a time delay capacitor 163 is connected. When the winding 159 is energized the armatures 165, 167, 169 and 171 of the relay 161 are moved into engagement with terminals 173, 175, 177 and 179 respectively. Engagement between terminals 165 and 173 connect the emitter terminal 65 to ground via the normally closed armature 181 and contact 183 of relay 189, lead 185, the normally closed armature 191 and terminal 193 of relay 195, and lead 187. Engagement of armature 167 with terminal 175 connects the collector terminal 69 to a testing circuit 197 designed to test for base-collector breakdown, power and biasing for that circuit being provided by battery 199. The details of this sensing circuit may take various forms, and form no part of the present invention, so that the circuit is disclosed in block diagram form. The connection to the circuit 197 is accomplished by means of normally closed armature 201 and terminal 203 of relay 189, lead 203', normally closed armature 205 and terminal 207 of relay 195, and lead 207'. The base terminal 67 is connected to ground via normally closed armature 209 and terminal 211 of relay 189. This properly biases the transistor under test for the base-collector breakdown test, and if such breakdown occurs the winding 213 of relay 215 is energized.

The engagement of armature 171 and terminal 179 of relay 161, which occurs when the winding 159 is energized, connects the plus 80 volt line 107 to the winding 215 of relay 195 via switch 401. A time delay capacitor 217 is connected across winding 215. The existence of the time delay capacitor 217 prevents the winding 215 from being energized until sufficient time has elapsed for the making of the base-collector breakdown test. After that time period has elapsed, however, the winding 215 is energized, moving armature 191 into engagement with terminal 219, armature 205 into engagement with blind terminal 221, armature 223 into engagement with terminal 225, and armature 227 into engagement with terminal 229.

Engagement between armature 191 and terminal 219 connects the emitter terminal 65 to the emitter-base breakdown testing circuit 231' via elements 181, 183 of relay 189, lead 185, lead 219' and elements 169 and 177 of relay 161. Power and biasing for the testing circuit 231' is provided by the battery 119. This testing circuit 231' is shown in block form for reasons previously explained with regard to the testing circuit 197. Removal of the armature 205 from the terminal 207 disconnects the collector terminal 69 from the base-collector breakdown testing circuit 197 and open-circuits the collector terminal 69. Grounding of the base terminal 67 remains undisturbed. The system is then set up for testing the base-emitter breakdown current, and if such breakdown current flows, the testing circuit 231' will energize the winding 233' of the relay 235'.

Energization of the relay 195 will cause armature 223 to engage terminal 225. Terminal 225 is connected by leads 227 and 229 to armature 231 of relay 233. That armature is normally in engagement with blind terminal 235. The armature 223 is connected to lead 237. At this point in the cycle of operations this particular contact engagement has no immediate effect.

Engagement between armature 227 and terminal 229 applies an 80 volt potential to the winding 239 of relay 189 via switch 403. Time delay capacitor 241 is connected across winding 239. Hence the winding 239 will not become energized for a period of time sufficient to permit the carrying out of the base-emitter breakdown test. After that time has elapsed, however, the winding 239 of relay 189 will become energized. The armature 181 will be moved into engagement with terminal 243, which is in turn connected to ground via resistor 245, thus grounding the emitter terminal 65. The armature 201 will be moved into engagement with terminal 247, thus connecting the collector terminal 69 to the positive side of a 10.5 volt battery 249. The negative side of that battery is connected via terminal 251 and armature 253 of relay 233 to lead 255, that lead going to gain testing circuit 257, the power and biasing for which is provided by battery 199. The armature 209 is connected to terminal 259, which in turn is connected via resistor 261 to the positive side of 45-volt battery 263, the negative side of which is grounded. This conditions the transistor engaged by the probe elements 14, 16 and 18 for the testing of its DC gain, and in the event that that gain is not high enough, the gain testing circuit 257 will cause the winding 265 of relay 267 to be energized.

If desired, a second gain testing circuit 257' can be utilized, so designed as to require a unit under test to have a higher gain than circuit 257 in order to pass. If these more rigorous requirements are not met, the testing circuit 257' will actuate the winding 265' of relay 267'. Purely by way of example the gain circuit 257 could be designed to pass all units having a gain of at least 20, whereas circuit 257' will pass a unit only if its gain is at least 40. Network 405 connects lead 255 to testing circuit 257'.

Engagement between armature 269 and terminal 271 will apply operating potential to the winding 273 of relay 233, a time delay capacitor 275 being connected thereacross so as to delay the energization of the winding 273 for a sufficient period of time to permit the gain testing circuit 257 (and 257' if provided) to perform its desired function. After that period of time has elapsed, the relay 273 is energized, the armature 231 engages terminal 277, the armature 253 is separated from terminal 251 and engages blind terminal 279, and the armature 281 engages terminal 283. The engagement between armature 231 and terminal 277 applies positive potential, via leads 105, 229 and 285, to terminal 287 of relay 267. The separation of armature 253 from terminal 251 disconnects the collector terminal 69 from the testing circuit 257 (and 257', if provided). The engagement of armature 281 with terminal 283 applies a positive potential, from lead 107 and relay elements 171–179, 227–

229 and 269–271, via leads 289 and 291, to the winding 293 of relay 295.

Line 105, maintained at a potential of plus 26 volts from battery 73 via relay 81, is connected to line 297, which in turn is connected to the armatures 299 and 301 of the relays 215 and 235 respectively. Line 105 is also connected to the armatures 303, 305 and 307 of relay 309, adapted to be actuated by winding 311, and to armature 313 of relay 295. When winding 213 of relay 215 is energized, as will be the case when the base-emitter circuit of the transistor under test breaks down, armature 299 engages contacts 315, which are in turn connected, via lead 317, to counting device 319, that counting device 319 then recording the number of units which fail the base-emitter breakdown test. The lead 317 is connected by rectifier 321 to lead 323, which in turn is connected, by lead 325, to winding 311 of the relay 309. Thus failure of the base-emitter breakdown test will also cause energization of relay 309.

Similarly, if the base-collector breakdown test is failed, winding 233′ of relay 235′ will be energized, armature 301 will be brought into engagement with contacts 327, counting device 329 will be energized via lead 331, thereby to record the number of units which fail the base-collector breakdown test, and energization of the circuit through rectifier 333 and leads 323 and 325 will cause energization of the winding 311 of the relay 309.

When the relay 309 is energized, armature 303 engages contact 335, armature 305 is moved away from terminal 337, armature 339 is moved into engagement with terminal 341, and armature 307 is moved into engagement with armature 343. Engagement of elements 303 and 335 applies a positive potential to armature 345 of relay 295 via lead 347. Disengagement of elements 305 and 337 removes positive potential from armature 349 of relay 295, that potential normally being applied via lead 351. Engagement of elements 339 and 341 applies positive potential to armature 353 of relay 295 from terminal 149 via lead 395 and 355. Engagement of elements 307 and 343 completes a holding circuit through winding 311 via lead 357, 323 and 325, so that the relay 309, when once energized, will remain energized for as long as power is applied to lead 105.

The winding 293 of relay 295 is adapted to be energized via lead 291 and elements 281 and 283 of relay 233, and thus will be energized only after all of the tests have taken place. When its winding 293 is energized armature 313 is moved into engagement with terminal 359, armature 345 is moved into engagement with terminal 361, armature 349 is moved into engagement with terminal 363 and armature 353 is moved into engagement with terminal 365. The engagement of elements 313 and 359 energizes units-tested counting device 367 and also, via rectifier 369 and lead 371, energizes bulb 373. Engagement of elements 345 and 361 energizes units-failed counting device 375 when armature 345 is live, which will be the case only when relay 309 is energized and elements 303 and 335 thereof are engaged. Engagement of elements 349 and 363 energize units-passed counting device 377, but only when armature 349 is live, which will be the case when relay 309 is not energized and elements 305 and 337 thereof are engaged. Engagement of elements 349 and 363, when armature 349 is live, also applies a voltage to lead 379 which is connected to contact 381 of relay 267′. When relay 267′ is non-energized, as will be the case when the gain tested by circuit 357′ does not meet a particular standard, the armature 383′ of relay 367′ will connect terminal 381 to terminal 385, thus energizing second-gain-test counting device 387. Engagement between elements 353 and 365 will, when elements 339 and 341 of relay 309 are closed, close a circuit to terminal 389 and, via lead 391, to solenoid 393. This circuit may be traced from positive terminal 149, lead 395, elements 339 and 341, lead 355, elements 353 and 365, lead 397, terminal 389, lead 391, solenoid winding 393 and lead 157 to grounded terminal 159. The solenoid winding 393 controls the marking of the unit under test to indicate whether it has passed or failed the test, or controls any other suitable indicating means, such as a light or buzzer. If the switch 153 is actuated to connect leads 151 and 391, a circuit is completed energizing the solenoid winding 393, thus providing means for manually controlling the marking of a tested unit.

If the unit under test does not pass the gain test as measured by testing circuit 357, winding 265 of relay 267 will not be energized and hence armature 383 thereof will connect contact 287 with contact 399, the latter being connected to gain-test counting device 401 by lead 403. When relay 233 is energized and elements 231 and 277 thereof engage, and relay 267 is not energized, the counting device 401 will be energized via leads 105 and 285. When the counting device 401 is energized, rectifier 405 and leads 407 and 325 will also cause energization of the winding 311 of the relay 309. If the gain test is passed, however, armature 383 of relay 267 will connect terminals 409 and thus provide a holding circuit for winding 265, which may be traced through lead 237, elements 223 and 225 of relay 195, and leads 227 and 105, and via elements 87 and 79 of relay 81, to the source 73 of positive potential. Similarly, when the gain test measured by testing circuit 257′ is failed, winding 265′ of relay 267′ will not be energized, thus making electrical connection between terminals 381 and 385, but if the gain test is passed the armature 383′ will connect terminals 411, thus producing a similar holding circuit for the winding 265′.

All of the holding circuits are dependent, of course, upon a source of positive potential, and this is controlled by the relay 81.

The switches 401 and 403 provide means to bypass one or both of the second and third tests normally carried out. If switch 401 is actuated to connect to lead 411, positive potential will be applied to lead 291, energizing relay 295, as soon as relay 161 closes. This will terminate the testing after only the first test has been performed. If switch 403 is actuated to connect to lead 413, relay 295 will be energized as soon relay 195 closes. This will terminate the testing after the first two tests have been performed.

The operation of the system of FIG. 3, after the support head 12 has moved down all the way and proper electrical connection has been made to the device under test, thus energizing relays 9 and 81, is as follows: When relay 161 closes the base-emitter breakdown is tested. If the unit passes nothing happens, but if the unit fails relay 215 is energized, counting device 319 records and relay 309 is energized. After a suitable time delay relay 195 is energized and the base-collector breakdown test is carried out. If the unit passes nothing happens, but if the unit fails relay 235′ is energized, counting device 329 records, and relay 309 is energized. The first time that relay 309 is energized the holding circuit contacts 307 and 343 engage, thus maintaining relay 309 energized during the entire cycle.

After a predetermined period of time, relay 189 is energized and the gain test or tests are carried out. Testing circuit 257, which makes the minimal gain test, is so designed that if the gain is insufficient relay 267 is not energized, but if the gain is sufficient that relay is energized, breaking the circuit between contacts 287 and 399 and establishing a holding circuit therefor via contacts 409. If the gain test is failed, when after a predetermined period of time, relay 233 is energized, a circuit is completed through counting device 401, relay 309 also being energized if it was not energized before.

Thus the counting device 319 will count the number of units which fail the base-emitter test, counting device 329 will count the number of units which failed the base-collector breakdown test, and counting device 401 will count the number of units which fail the gain test as tested by circuit 257. Failure of one or more of these tests will cause energization of relay 309.

The energization of relay 233, which occurs at the end of the test cycle, will, via elements 281 and 283 thereof, energize relay 295. This relay will then actuate other devices in accordance with the existing condition of relay 309. If relay 309 is not energized, as will be the case if the device under test has passed all three of the tests, energization of relay 295 will energize counting device 367, which will count the number of units tested, and will energize bulb 373, giving a signal to the operator that the test cycle has been completed. It will also energize counting device 377, which will therefore count the number of units which pass all of the tests. On the other hand, if relay 309 is energized when relay 295 is energized, as will be the case when one or more of the three tests are failed, then the energization of relay 295 will energize units-tested counting device 367 and counting device 375, the latter counting the number of units which fail one or more of the three tests. The light 373, indicating to the operator that the test cycle has been compleed, is also energized. In addiiton, the solenoid 393 controlling the marking of the faulty unit, will also be energized.

The counter 387 operatively connected to the gain test circuit 257' will be energized at the end of each testing cycle only when the test made thereby is failed and all of the other tests are passed, since positive potential is applied to the lead 379 feeding terminal 381 only when relay 295 closes and relay 309 is not energized.

When the light 373 (or any other suitable indicator, visual or aural) apprises the operator that the test cycle has been completed, the operator will lift the support head 12. This will move the mask 143, interrupt the beam of light from bulb 141 to the phototransistor 125, and will deenergize the relay 81, thus removing power from the testing circuit 71. All holding circuits fail and all relays then return to their original conditions. The leads 105 and 107 are grounded via relay 81, and the circuit is then ready for another test.

Mention has been made of the difficulty involved in marking the unit under test in accordance with the results of that test, said difficulty deriving from the extremely small size of an individual transistor. One solution to this problem is to mark a given transistor after it has been tested, and while a succeeding transistor, and usually the next succeeding transistor, is being tested. Of course, it is desirable that each transistor be marked in accordance with the manner in which it reacted to the tests. Hence the actuation of the marking device involves, during a given test cycle, "remembering" the results of the preceding test cycle and actuating the marking device in accordance with those remembered results.

Figure 4:
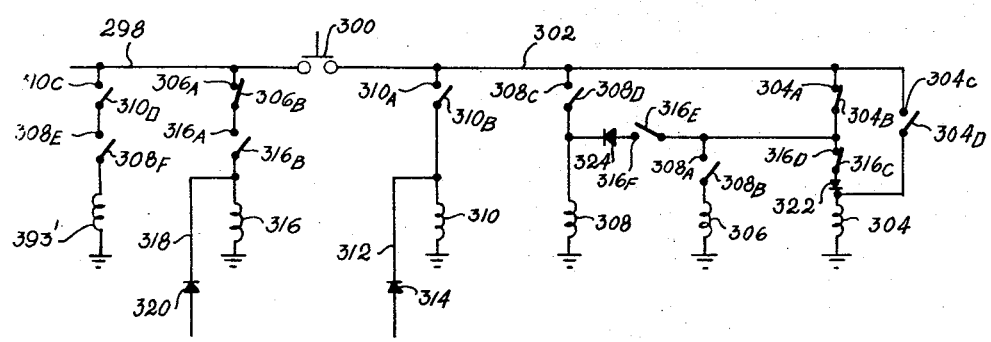
FIG. 4 is a circuit diagram of a memory system which permits the marking device to appropriately mark a specimen which has previously been tested while a succeeding specimen is being tested.

A circuit for providing this type of memory is shown in FIG. 4. Line 298 is a source of power, and may, for example, correspond to lead 77 of FIG. 3. Switch 300 is adapted to be closed when the circuit head 12 comes down and the probe elements 14, 16 and 18 engage the transistor under test, thus connecting the source of operating potential to line 302. Switch 300 could correspond to elements 79 and 87 of relay 81 in the system of FIG. 3. Winding 304 will be energized when the switch 300 closes via normally closed contacts $304_A$ and $304_B$ and normally closed contacts $316_C$ and $316_D$. When the winding 304 is energized holding contacts $304_C$ and $304_D$ are closed and contacts $304_A$ and $304_B$ are opened. Rectifier 322 is interposed between winding 304 and contact $316_C$. Winding 306, when energized, opens normally closed contacts $306_A$ and $306_B$. Winding 308, when energized, closes normally open contacts $308_A$ and $308_B$, closes normally open holding contacts $308_C$ and $308_D$, and closes normally open contacts $308_E$ and $308_F$. Winding 310 is connected via lead 312 and rectifier 314 to a device producing a signal for each unit tested, such as the counting device 367 of FIG. 3, said winding 310 therefore being energized each time that a device is tested, and preferably at the close of the testing cycle. Energization of winding 310 closes normally open holding contacts $310_A$ and $310_B$, and closes normally open contacts $310_C$ and $310_D$.

Winding 316 is connected by lead 318 and rectifier 320 to a device producing a signal for each unit failing one or more tests, such as the counting device 375 of FIG. 3, said winding 316 therefore being actuated whenever a unit fails one or more of the three tests performed by the testing circuits 197, 231' and 257 of FIG. 3. Energization of winding 316 closes normally open contacts $316_A$ and $316_B$, opens normally closed contacts $316_C$ and $316_D$, and closes normally open contacts $316_E$ and $316_F$. A rectifier 324 is interposed between winding 308 and contact $316_F$. Winding 393' represents the solenoid winding which actuates the marking device, and corresponds to the element 26 of FIG. 1.

To explain the manner in which the circuit of FIG. 4 operates, let us consider a first cycle in which the test transistor passes all of its tests. Closing of switch 300 energizes winding 304 via contacts $304_{A-B}$ and $316_{C-D}$. A holding circuit is completed through windings $304_{C-D}$, and contacts $304_{A-B}$ open. When winding 310 is energized, indicating that a unit has been tested, a holding circuit is completed through contacts $310_{A-B}$, and contacts $310_{C-D}$ are closed, but this has no effect because contacts $308_{E-F}$ are open. Since the unit has passed all of its tests, winding 316 is not energized. Nothing further happens. At the close of the test the switch 300 is opened and everything is deenergized and returns to its original state.

Let us assume that in the next cycle the unit fails. Once again winding 304 is energized and holds, contacts $304_{A-B}$ opening. Now, because the unit fails, winding 316 is energized, a holding circuit being completed through $316_{A-B}$ and $306_{A-B}$. $316_{E-F}$ closes, but is of no effect because contacts $304_{A-B}$ are open and because of the polarity of rectifier 322. Contacts $316_{C-D}$ are also opened. When winding 310 is energized, and is held by the closing of contacts $310_{A-B}$, contacts $310_{C-D}$ are closed but have no effect, since contacts $308_{E-F}$ remain open. When the switch 300 is opened at the end of the test, windings 304 and 310 are deenergized but winding 316 remains energized, so that contacts $316_{E-F}$ remain closed and contacts $316_{C-D}$ remain open.

Let us assume that on the third cycle the transistor passes all tests. Now the closing of switch 300 at the beginning of the third cycle will not energize winding 304 because the contracts $316_{C-D}$ are separated. Instead, winding 308 will be energized via closed contacts $316_{E-F}$. This will close holding contacts $308_{C-D}$ and will also close contacts $308_{A-B}$, energizing winding 306, thereby opening contacts $306_{A-B}$ and deenergizing winding 316. The deenergization of winding 316 will permit contacts $316_{C-D}$ to close, thus energizing winding 304, a holding circuit therefore being established by contacts $304_{C-D}$. The simultaneous opening of contact $304_{A-B}$, coupled with the orientation of the rectifier 322, deenergizes winding 306, thus permitting contacts $306_{A-B}$ to close. The deenergization of winding 316 opens contacts $316_{E-F}$, but winding 308 remains energized via contacts $308_{C-D}$, and hence contacts $308_{E-F}$ remain closed. Then when winding 310 is energized, contacts $310_{C-D}$ will close and this will close a circuit through the solenoid winding 393', causing the marking device 24 to apply a mark. At the end of the cycle, when switch 300 opens, windings 306, 308 and 310 will all be de-energized, and all of the relays will revert to their initial de-energized condition, the situation then being precisely the same as after the first described cycle, where the unit also passed. Thus it will be seen that the marking device 24 was actuated on the third cycle because the device tested on the second cycle failed, and that the marking device 24 would not be actuated on the next succeeding cycle, whether the device then being tested passed or failed, because the device tested in the third cycle passed.

For completeness, let us consider an alternative third cycle in which the unit under test fails instead of passes. Bearing in mind that in the preceding second cycle there was a failure, so that winding 316 was energized and has remained energized, the closing of switch 300 will, as before, cause energization of winding 308, which will be held energized by contacts $308_{C-D}$ and which will in turn, via contacts $308_{A-B}$, energize winding 306, opening contacts $306_{A-B}$ and de-energizing winding 316. Contacts $308_{E-F}$ will be closed, but will be ineffective at this point because contacts $310_{C-D}$ are open. The energization of winding 310 will close contacts $310_{C-D}$, thus closing the circuit to the solenoid 393' and causing the marking device 24 to be actuated. The winding 316 will then be re-energized by the signal indicating that the device then under test has failed. A holding circuit will be established through the now closed contacts $316_{A-B}$. Contacts $316_{C-D}$ will be opened, but they will have no effect, and contacts $316_{E-F}$ will be closed, but they will have no effect. Now when winding 310 is energized, as it is for each testing cycle, contacts $310_{C-D}$ will be closed and winding 393' will be energized, thereby actuating the marking device 24. When the switch 300 opens windings 304, 308 and 310 will be de-energized, windings 306 having been previously de-energized, solenoid 393' will be de-energized because of the opening of contacts $310_{C-D}$ and $308_{E-F}$, but winding 316 will remain energized thereby to "remember" that the device just tested has failed and to cause actuation of the marking device 24 on the next cycle of operation.

The memory and marking device actuation system of FIG. 4 could be used with the system of FIG. 2, in which case the switch 300 of FIG. 4 could correspond to the switch 148 of FIG. 2, the lead 312 could be connected to the counting device 142 of FIG. 2 which counts the number of units tested, and the lead 318 could be connected to the winding 112 of relay 114, which is designed to be energized whenever a test is failed.

When the device is designed to mark each unit after it has been tested and while the unit adjacent thereto is being tested, a problem arises when the operator has tested the last unit in a row. If the operator moves the head 12 to the first unit in the next row, the last unit in the preceding row will not be in a position to be marked. Accordingly, after the operator has tested the last unit 4 in a given row, and when she is apprised in any appropriate manner, as by a bulb or buzzer, that that unit has failed a test, she will then bring the head 12 down with the marking device 24 in registration with that last unit 4 and with the probe elements 14, 16, 18 out of engagement with any unit 4. She will then manually energize the winding 393' of FIG. 4, thereby to cause the marking device 24 to make a mark upon the failing unit, and she will also manually energize winding 306 of FIG. 4, thereby to de-energize winding 316 by opening the contacts $306_{A-B}$. A separate manual switch and appropriate energizing circuits can readily be provided to this end.

Thus the device of the present invention permits rapid and at least semi-automatic testing of transistors for a plurality of operating conditions. Once the probe elements 14, 16 and 18 have been brought into proper position, which may be accomplished either manually by the operator or by appropriate automatic equipment, the testing proceeds, the results of the tests are tabulated, a suitable indication as to whether the unit has passed or failed is given, and the testing is terminated, ready to be resumed when the device is operatively positioned relative to the next unit to be tested. Thus an operator can move rapidly from one unit to another and need attend only to the proper positioning of the device relative to the unit under test and to a signal or indication that the test has been completed. In addition, means are provided to mark the individual units in accordance with whether they have passed or failed the tests, so that the operator need not stop in the course of a sequence of tests in order to remove a unit which fails. A batch of many hundred units may be tested one after the other and then removed from the testing station, where those units marked to indicate failure can be separated from the passing units by some other operator, and without delaying the carrying out of the testing operations on a succeeding batch of transistors. Because of the extremely small size of the individual transistors, it may be desired to mark a transistor on the test cycle following that to which it was subjected. In this way the marking device and the probe elements may each be designed in optimum manner without interfering with one another.

Means may be provided for permitting the tests to be carried out only after the device has first sensed that it is in proper position for the carrying out of the tests and that adequate electrical connection has been made to the transistor to be tested.

While but a limited number of embodiments of the present invention have been here disclosed, in which certain types of tests, certain types of markings, and certain types of automatic tabulations have been incorporated, and in which specific circuits have been disclosed for the carrying out of the desired functions, it will be apparent that many variations may be made as to all of these factors, without departing from the spirit of the invention as defined in the following claims.

We claim:

1. A transistor testing device comprising a movable support, elements on said support for making electrical connection with the base, emitter and collector respectively of a transistor specimen under test when said support is moved toward said specimen, means for moving said support so as to bring said elements into operative engagement with said specimen, first and second circuitry means connected to said elements for testing first and second operational conditions respectively of said specimen, means for actuating said first circuitry means, time delay means operatively connected to said second circuitry means for actuating the latter a predetermined period of time after said first circuitry means has been actuated, and indicating means operatively connected to said first and second circuitry means and actuated thereby in accordance with the results of the tests carried out, said indicating means comprising a specimen-marking device and means for actuating said device in accordance with the response of a specimen to said tests, said specimen marking device being spaced laterally from said elements so as to engage a given specimen spatially displaced from the test specimen engaged by said elements at a particular moment, said actuating means being effective on said marking device to cause said marking device to mark said given specimen.

2. A transistor testing device comprising a movable support, elements on said support for making electrical connection with the base, emitter and collector respectively of a transistor specimen under test when said support is moved toward said specimen, means for moving said support so as to bring said elements into operative engagement with said specimen, first and second circuitry means connected to said elements for testing first and second operational conditions respectively of said specimen, means for actuating said first circuitry means, time delay means operatively connected to said second circuitry means for actuating the latter a predetermined period of time after said first circuitry means has been actuated, and indicating means operatively connected to said first and second circuitry means and actuated thereby in accordance with the results of the tests carried out, said indicating means comprising a specimen-marking device and means for actuating said device in accordance with the response of a specimen to said tests, said specimen marking device being spaced laterally from said elements so as to engage a given and previously tested specimen spatially displaced from the test specimen engaged by said element at a particular moment, said actuating means being effective on said marking device to cause said marking device to mark said given specimen in accordance with the results of said previous test.

3. A transistor testing device comprising a movable support, elements on said support for making electrical connection with the base, emitter and collector respectively of a transistor specimen under test when said support is moved toward said specimen, means for moving said support so as to bring said elements into operative engagement with said specimen, first and second circuitry means connected to said elements for testing first and second operational conditions respectively of said specimen, means for actuating said first circuitry means, time delay means operatively connected to said second circuitry means for actuating the latter a predetermined period of time after said first circuitry means has been actuated, and indicating means operatively connected to said first and second circuitry means and actuated thereby in accordance with the results of the tests carried out, and a source of power for said circuitry means, switch means operative to connect and disconnect said power source from said circuitry means, and control means for said switch means, said control means being operatively connected to said elements and effective to actuate said switch means to connecting condition only when said elements make proper electrical connection with the appropriate parts of the specimen under test.

4. The device of claim 3, in which said support is movable toward said specimen through a first station when said elements engage said specimen to a second station where testing occurs, said elements being articulately mounted on said support to permit movement of said support from said first station to said second station, said control means comprising first means actuated when said elements electrically engage said specimen properly and second means actuated only when (a) said first means is actuated and (b) said head is in said second station, said second means, when actuated, actuating said switch means.

5. A transistor testing device comprising a movable support, elements on said support for making electrical connection with the base, emitter and collector of a transistor specimen under test when said support is moved toward said specimen, means for moving said support so as to bring said elements into operative engagement with said specimen, first circuitry means for testing an operational condition of said specimen, another circuitry means for testing a different operational condition of said specimen, control means for selectively connecting said first and second circuitry means respectively to said elements, said control means normally connecting said first circuitry means thereto and disconnecting said other circuitry means therefrom, means for initiating the testing carried out by said first circuitry means, time delay means for actuating said control means to connect said second circuitry means to said elements and to disconnect said first circuitry means therefrom a predetermined period of time after said first circuitry means commences to test, and indicating means operatively connected to said circuitry means and actuated thereby in accordance with the results of the tests carried out, said indicating means comprising a specimen-marking device and means for actuating said device in accordance with the response of a specimen to said tests, said specimen marking device being spaced laterally from said elements so as to engage a given specimen spatially displaced from the test specimen engaged by said elements at a particular moment, said actuating means being effective on said marking device to cause said marking device to mark said given specimen.

6. A transistor testing device comprising a movable support, elements on said support for making electrical connection with the base, emitter and collector of a transistor specimen under test when said support is moved toward said specimen, means for moving said support so as to bring said elements into operative engagement with said specimen, first circuitry means for testing an operational condition of said specimen, another circuitry means for testing a different operational condition of said specimen, control means for selectively connecting said first and second circuitry means respectively to said elements, said control means normally connecting said first circuitry means thereto and disconnecting said other circuitry means therefrom, means for initiating the testing carried out by said first circuitry means, time delay means for actuating said control means to connect said second circuitry means to said elements and to disconnect said first circuitry means therefrom a predetermined period of time after said first circuitry means commences to test, and indicating means operatively connected to said circuitry means and actuated thereby in accordance with the results of the tests carried out, said indicating means comprising a specimen-marking device and means for actuating said device in accordance with the response of a specimen to said tests, said specimen marking device being spaced laterally from said elements so as to engage a given and previously tested specimen spatially displaced from the test specimen engaged by said elements at a particular moment, said actuating means being effective on said marking device to cause said marking device to mark said given specimen in accordance with the results of said previous test.

7. A transistor testing device comprising a movable support, elements on said support for making electrical connection with the base, emitter and collector of a transistor specimen under test when said support is moved toward said specimen, means for moving said support so as to bring said elements into operative engagement with said specimen, first circuitry means for testing an operational condition of said specimen, another circuitry means for testing a different operational condition of said specimen, control means for selectively connecting said first and second circuitry means respectively to said elements, said control means normally connecting said first circuitry means thereto and disconnecting said other circuitry means therefrom, means for initiating the testing carried out by said first circuitry means, time delay means for actuating said control means to connect said second circuitry means to said elements and to disconnect said first circuitry means therefrom a predetermined period of time after said first circuitry means commences to test, and indicating means operatively connected to said circuitry means and actuated thereby in accordance with the results of the tests carried out, and a source of power for said circuitry means, switch means operative to connect and disconnect said power source from said circuitry means, and control means for said switch means, said control means being operatively connected to said elements and effective to actuate said switch means to connecting condition only when said elements make proper electrical connection with the appropriate parts of the specimen under test.

8. The device of claim 7, in which said support is movable toward said specimen through a first station when said elements engage said specimen to a second station where testing occurs, said elements being articulately mounted on said support to permit movement of said support from said first station to said second station, said control means comprising first means actuated when said elements electrically engage said specimen properly and second means actuated only when (a) said first means is actuated and (b) said head is in said second station, said second means, when actuated, actuating said switch means.

9. A transistor testing device comprising a movable support, elements on said support for making electrical connection with the base, emitter and collector of a transistor specimen under test when said support is moved toward said specimen, means for moving said support so as to bring said elements into operative engagement with said specimen, first counting means actuated when said head is thus moved, first circuitry means for testing an operational condition of said specimen, another circuitry means for testing a different operational condition of said specimen, control means for selectively connecting said first and second circuitry means respectively to said elements, said control means normally connecting said first circuitry means thereto and disconnecting said other circuitry means therefrom, means for initiating the testing carried out by said first circuitry means, time delay means for actuating said control means to connect said second circuitry means to said elements and to disconnect said first circuitry means therefrom a predetermined period of time after said first circuitry means commences to test, second counting means operatively connected to said circuitry means and effective to indicate the number of specimens which respond to said tests in a given manner, and additional indicating means operatively connected to said circuitry means and actuated thereby in accordance with the results of the tests carried out.

10. The transistor testing device of claim 9, in which said indicating means comprises a specimen-marking device and means for actuating said device in accordance with the response of a specimen to said tests.

11. The transistor testing device of claim 9, in which said indicating means comprises a specimen-marking device and means for actuating said device in accordance with the response of a specimen to said tests, said specimen marking device being spaced laterally from said elements so as to engage a given and previously tested specimen spatially displaced from the test specimen engaged by said elements at a particular moment, said actuating means being effective on said marking device to cause said marking device to mark said given specimen in accordance with the results of said previous test when said test specimen is being tested at said particular moment.

12. In the testing device of claim 9, a source of power for said circuitry means, switch means operative to connect and disconnect said power source from said circuitry means, and control means for said switch means, said control means being operatively connected to said elements and effective to actuate said switch means to connecting condition only when said elements make proper electrical connection with the appropriate parts of the specimen under test.

13. The device of claim 12, in which said support is movable toward said specimen through a first station when said elements engage said specimen to a second station where testing occurs, said elements being articulately mounted on said support to permit movement of said support from said first station to said second station, said control means comprising first means actuated when said elements electrically engage said specimen properly and second means actuated only when (a) said first means is actuated and (b) said head is in said second station, said second means, when actuated, actuating said switch means.

References Cited
UNITED STATES PATENTS

| | | | |
|---|---|---|---|
| 1,610,563 | 12/1926 | McIlvaine | 324—65 |
| 2,334,271 | 11/1943 | Malm | 200—61.42 |
| 2,546,256 | 3/1951 | Drake | 324—37 |
| 2,922,954 | 1/1960 | Bigelow | 324—158 |
| 2,999,587 | 9/1961 | Campbell | 324—158 XR |
| 3,039,604 | 9/1962 | Bickel | 324—158 XR |
| 3,185,927 | 5/1965 | Margulis | 324—158 |
| 3,217,246 | 11/1965 | Kallet | 324—54 |
| 3,235,802 | 2/1966 | Biard | 324—73 XR |

OTHER REFERENCES

Electronics (Marrott et al.), Jan. 13, 1961, pages 93–95, TK 7800.

RUDOLPH V. ROLINEC, *Primary Examiner.*

WALTER L. CARLSON, *Examiner.*

E. L. STOLARUN, *Assistant Examiner.*